United States Patent [19]
Blatt

[11] 4,388,576
[45] Jun. 14, 1983

[54] ELECTRIC SERVO DRIVE AIR CYLINDER

[76] Inventor: Leland F. Blatt, P.O. Box 220, Fraser, Mich. 48026

[21] Appl. No.: 304,794

[22] Filed: Sep. 23, 1981

[51] Int. Cl.³ .............................................. G05B 19/24
[52] U.S. Cl. .................................... 318/571; 318/602; 318/15
[58] Field of Search ......................... 318/602, 571, 15; 74/422, 89.15

[56] References Cited

U.S. PATENT DOCUMENTS

| | | | |
|---|---|---|---|
| 3,475,998 | 11/1969 | Steiner et al. | 318/602 X |
| 3,665,771 | 5/1972 | Blatt | 74/422 |
| 3,742,774 | 7/1973 | Blatt | 74/89.15 |
| 4,023,804 | 5/1977 | Owa | 318/603 |
| 4,201,935 | 5/1980 | Fukuma | 318/15 |

*Primary Examiner*—B. Dobeck
*Attorney, Agent, or Firm*—Cullen, Sloman, Cantor, Grauer, Scott & Rutherford

[57] ABSTRACT

An electric servo drive air cylinder includes ported end caps for alternately receiving air from a pressurized source, and a tubular piston rod mounting a piston for intermittent longitudinal reciprocal movements and a projecting rod end for connection to a load. A power rotated reversible ball screw extends through the piston rod and is journaled thereon and upon one end cap and projects therefrom. An axial ball nut is secured to the piston rod and threadedly receives the ball screw. A programmable D.C. motor is mounted upon an end cap and has a drive shaft coupled with the ball screw. An electronic encoder is connected to the ball screw and motor to control direction and number of rotations of the ball screw for effecting a programmed repetitive cycle of predetermined feed movements of the piston rod. A pre-set programmable control is connected to the motor and an electronic encoder feed back circuit which interconnects the encoder and the programmable control. A preset computer pneumerical control may be substituted for the programmable control.

15 Claims, 5 Drawing Figures

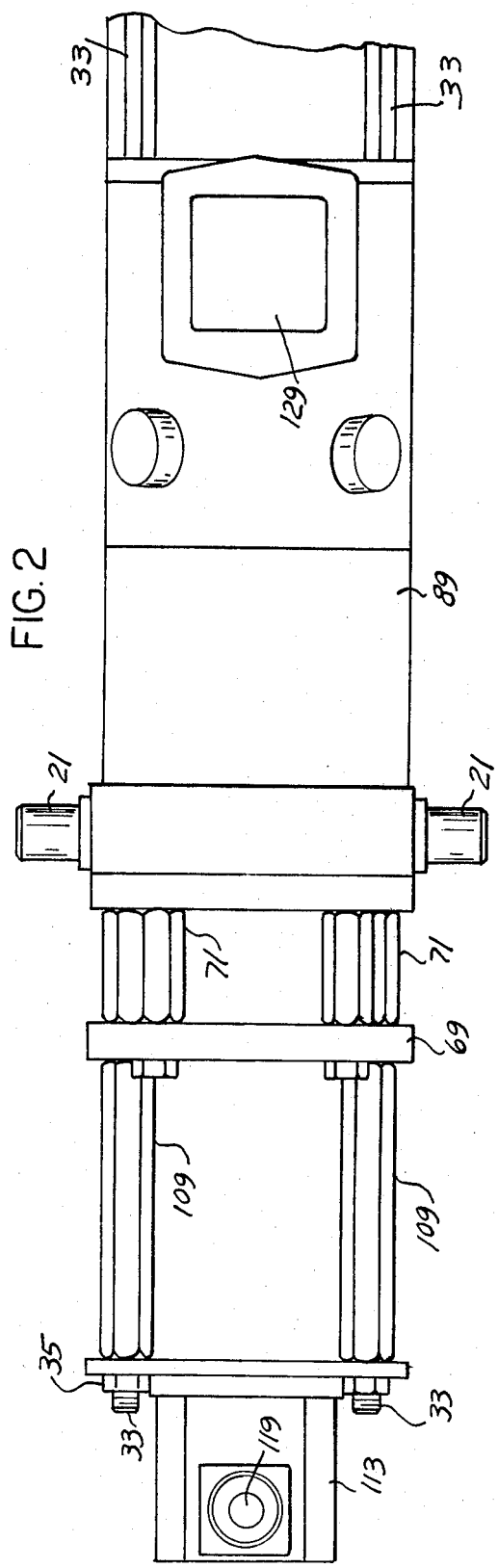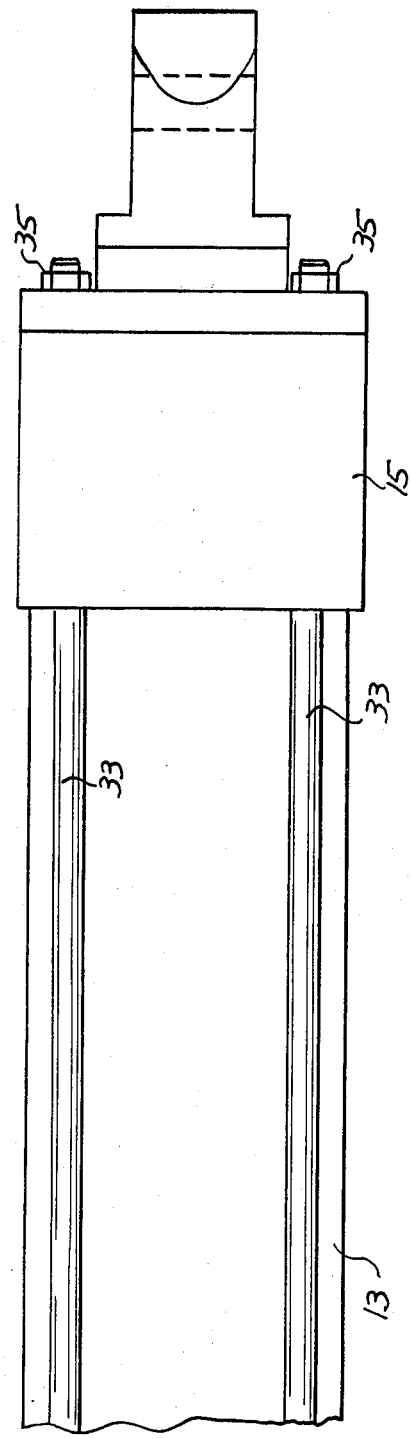

ELECTRIC SERVO DRIVE AIR CYLINDER

RELATED PATENT APPLICATIONS

Automatic Lift Unit, Ser. No. 287,765, Filed July 29, 1981 Electric Servo Drive Shuttle Unit, Ser. No. 284,559, Filed July 20, 1981

BACKGROUND OF THE INVENTION

Heretofore in the use of machine tools for forming workpieces and the like, there have been employed hydraulically operated cylinders adapted for effecting reciprocal movements of a workpiece gripper or for transporting a slide or a carriage for transporting a workpiece or a workpiece gripping tool to and from such press and in other areas. As is conventional, hydraulic cylinders have been controllably pressurized from opposite ends for effecting timed reciprocal movements of a piston rod connected to a load wherein pressurized air is directed from a valve mechanism to one end or the other of such hydraulic cylinder for effecting reciprocal movements of the projecting piston rod and rod end for reciprocating or moving a load.

In some areas a high degree of control is required for the accurate and incremental positioning and retraction of a workpiece or load. There has existed the need for a programmable control for the air cylinder for accurately controlling motion of the piston rod in any direction, for accurately effecting incremental feed movements in two directions and to provide an accurate method for controlling motion, all in a single mechanism and for accurately positioning the piston rod at any increment by extension or retraction thereof with respect to supporting cylinder.

THE PRIOR ART

License device of this general type for effecting longitudinal and reciprocal feed movements of a carriage or workpiece are shown in one or more of the following United States patents;
- U.S. Pat. No. 3,665,771, dated May 30, 1972 on Stroke Multiplying Retractor Mechanism
- U.S. Pat. No. 3,714,870, dated Feb. 6, 1973, on Duel Grip Actuating Unit with Travel Cylinder Assembly.
- U.S. Pat. No. 3,734,303, dated May 22, 1973, on Travel Cylinder and Gripper Actuator with Triple Guide Rods.
- U.S. Pat. No. 3,742,774, dated July 3, 1973, on Adjustable Stroke Retractor Mechanism
- U.S. Pat. No. 3,866,485, dated Feb. 18, 1975, on Angular Adjustment Mount for Workpiece Extractor.

There has been a need for a programmed cycle of reciprocal and interrupted feed movements in conjunction with a workpiece gripper tool or other load wherein there are controlled and/or programmable means for regulating substantial reciprocal movements of a load.

SUMMARY OF THE INVENTION

It is an important feature of the present invention to provide an electric servo drive air cylinder including ported end caps for alternately receiving air from a pressurized source for reciprocating a tubular piston rod mounting a piston for intermittent longitudinal and reciprocal movements wherein there is incorporated within the cylinder a power rotated reversible ball screw which extends through the piston rod and is journaled upon the cylinder and projects therefrom wherein an axial ball nut is secured to the piston rod and threadedly receives the ball screw driven by a programmable D.C. motor whose drive shaft is coupled with the ball screw.

A further feature incorporates the use of an electronic encoder which is connected to the ball screw and motor to control the direction and number of rotations of the ball screw for effecting a programmed repetitive cycle of predetermined feed movements of the piston rod.

A further feature is to provide an encoder feed back to a programmable control or to a computer numerical control and incorporating an electronic encoder connected to the feed back and to the motor for controlling the direction and number of rotations of the ball screw for effecting a programmed repetitive cycle at predetermined movements of the rod end of the piston rod controlling movements of a load connected thereto.

A further feature is to provide in conjunction with the electronic encoder, a preset programmer control (PC) or a computer numerical control (CNC) and an electronic encoder feedback circuit interconnecting the encoder and PC or CNC.

A further feature of the present invention is to provide in conjunction with the conventional air cylinder having a reciprocal piston rod and an electric motor operated ball screw, having an encoder feedback to a center PC (Programmable Control) or a CNC (Computer Numerical Control) and wherein the ball screw engages a ball nut secured to the piston rod for operating and controlling the piston rod wherein the pneumatic pressure is used to support a variety of piston rod loads while the electric D.C. motor operated ball screw not only controls the piston rod, but also its extremely accurate positioning of any increment of extension or retraction thereof with respect to the cylinder body.

A further feature is to provide an air cylinder of heavy duty construction to provide with an accurate method of controlling motion in any direction and increasing the load requirements of the cylinder coupled with an accurate method of controlling motion of the piston rod in a single mechanism and requiring a minimum of space.

A further feature of the present invention is to supportably mount and journal a D.C. motor operated ball screw upon an air cylinder assembly, wherein the ball screw is journalled for rotation upon the air cylinder and is adapted for threaded engagement with a ball nut connected to the piston rod and wherein the ball screw has an extension which is coupled to the input drive shaft of an encoder for controlling an electric motor drive for the ball screw for obtaining a predetermined programmable repetitive incremental and longitudinal feed and reciprocal movements.

A further feature incorporates in conjunction with the combination air cylinder and motor drive, an electronic braking mechanism which is energized when the motor is de-energized and promptly stops rotation of the ball screw.

These and other features and objects will be seen from the specification and claims in conjunction with the appended drawings.

THE DRAWINGS

FIG. 2 is a top plan view of FIG. 1.

FIG. 2a is a top plan view of FIG. 1a.

It will be understood that the above drawings illustrate merely a preferred embodiment of the invention, and that other embodiments are contemplated within the scope of the claims hereafter set forth.

DETAILED DESCRIPTION OF AN EMBODIMENT OF THE INVENTION

Figure 1:
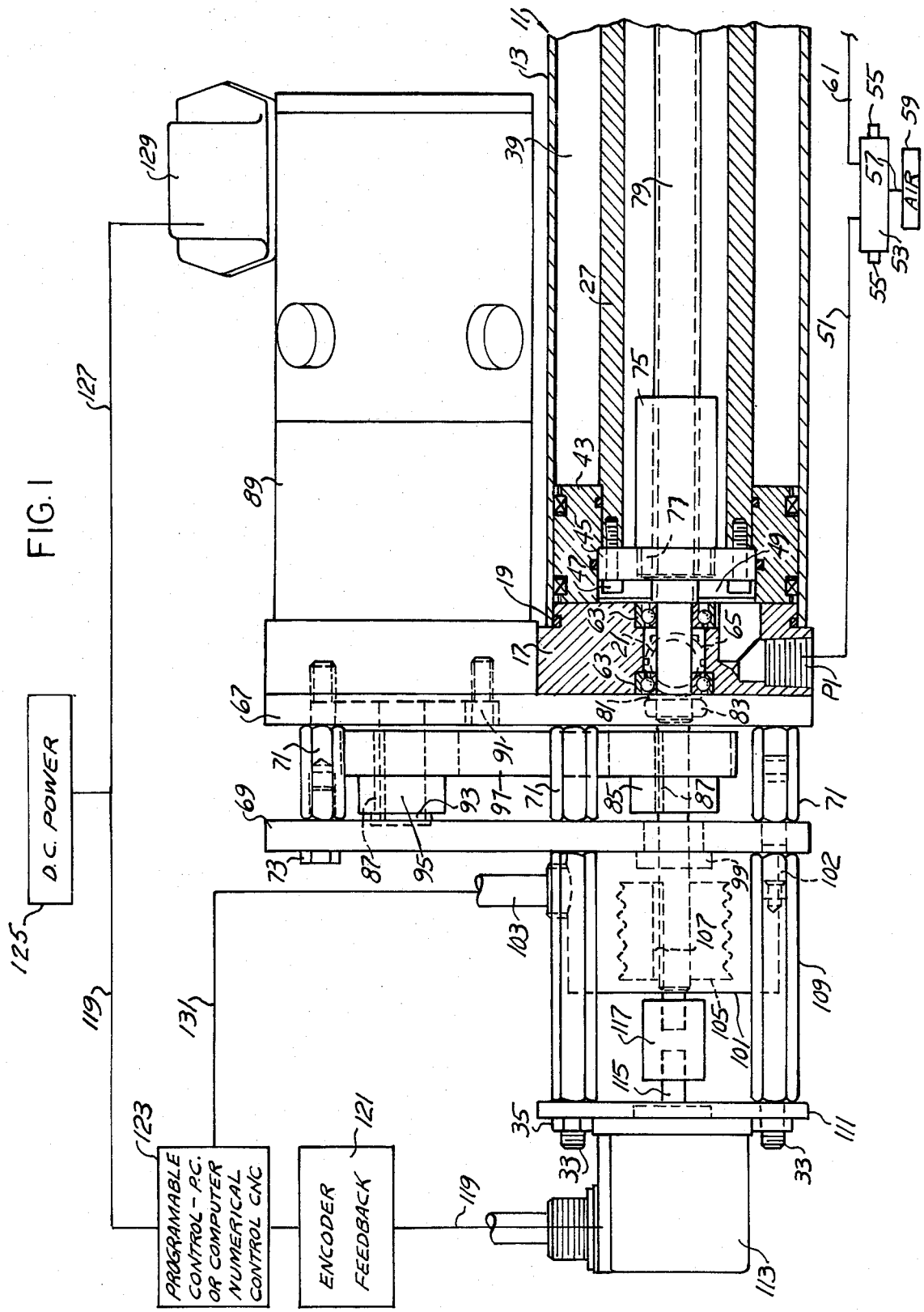
FIG. 1 is a fragmentary longitudinal section of one part of the present electric servo drive air cylinder.
Figure 1A:
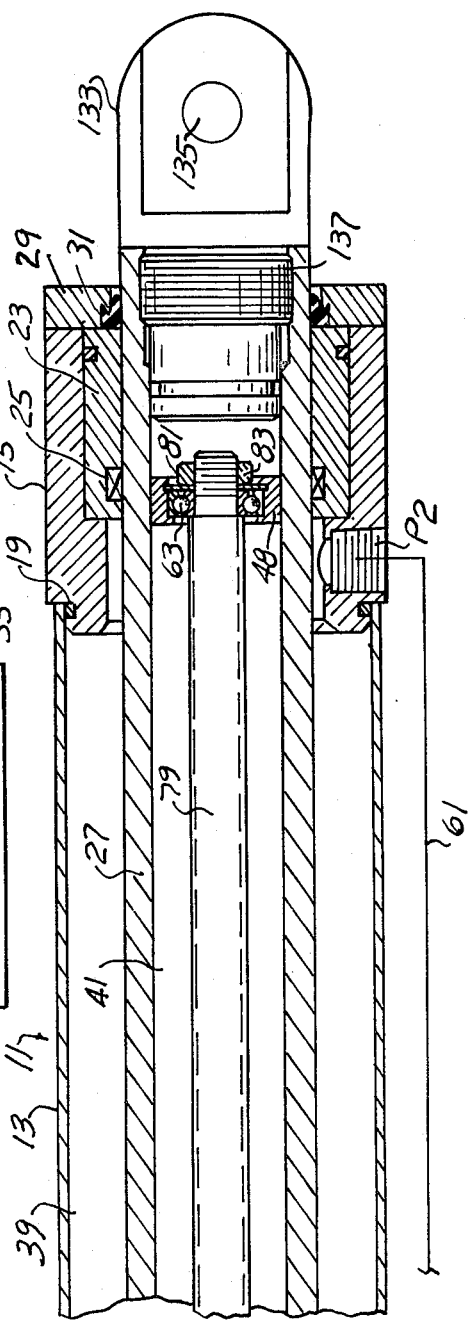
FIG. 1a is a similar view of the other part.

Referring to the drawings, the electric servo drive pneumatic cylinder is generally indicated at 11, FIGS. 1 and 1a and includes elongated cylinder tube 13, rod end cap 15, blind end cap 17, with suitable interposed O-ring seals 19.

Arranged upon opposite sides of end cap 17 are a pair of outwardly projecting opposed trunion mounts 21 by which the air cylinder assembly may be pivotally mounted upon a suitable support.

Rod end cap 15 supports therein rod gland 23 supporting rod seal 25 in cooperative sealing registry with the reciprocal tubular piston rod 27. Gland retainer 29 supports a conventional rod end wiper 31 in registry with the piston rod and is secured upon the end of end cap 15, FIG. 1.

Figure 3:
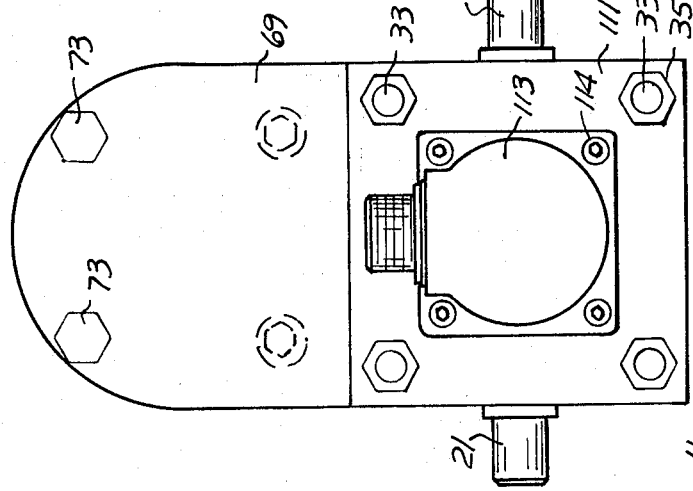
FIG. 3 is a left end elevational view thereof.

The end caps 15 and 17 are secured relative to the ends of the cylinder tube 13 by a plurality of parallel spaced elongated tie rods 33 associated jamb nuts 35 as shown in FIGS. 1, 2 and 3.

Tubular piston rod 27 has a longitudinal bore 41, and is movably positioned within cylinder bore 39, FIG. 1. Apertured piston 43 is mounted and suitably sealed over end of the piston rod and is secured thereto by the end plate 45 and fasteners 47. Said end plate is nested within axial bore 49 of piston 43 and is in communication with air pressure port P1 and associated passage within blind end cap 17.

Conduit 51 interconnects pressure port P1 and one of the cylinder outlets of the 4-way valve 53, FIG. 1 having a valve element in the illustrative embodiment, controlled by a pair of solenoids 55 at opposite ends thereof. A second pressure air port P2 is formed within rod end cap 15 in communication with bore 39 of the cylinder tube 13 and is interconnected by conduit 61 to the second cylinder port of the 4-way valve 53. Said valve has a pressure inlet 57 connected to a suitable source of pressurized air 59.

A pair of longitudinally spaced ball bearings 63 are secured within end cap 17 upon opposite sides of the bearing spacer 65 therein and are adapted to journal and support an intermediate portion of the elongated ball screw 79. Upright motor mount plate 67 at one end bears against the end face of end cap 17 and is secured thereto by tie rods 33.

Upright brake mount plate 69 is spaced rearwardly from motor mount plate 67 with suitable spacers 71 interposed between the two plates and positioned upon the tie rods 33. An upper machine screw 73 secures the upper end portion of the brake mount plate 69 with motor mount plate 67 with interposed spacer 71.

Axially positioned within piston rod 27 adjacent piston 43 is an elongated ball nut 75 whose collar 77 is threaded into end plate 45 and secured thereto and is in threaded engagement with the elongated ball screw 79.

End thrust washer 81 upon ball screw 79 retainingly engages inner race of the adjacent ball bearing 63 and is secured thereto by the lock nut 83 threaded onto ball screw 79. An additional ball bearing 63 is retained within ball bearing support 48 slidably positioned upon the interior of the piston rod 27 adjacent its outer end as shown in FIG. 1a. A corresponding washer 81 and lock nut 83 is threaded onto the outer end of the ball screw 79 and is in operative engagement with the inner race of said ball bearing. Said washers 81 and the lock nuts 83 retainingly engage the respective adjacent bearings 63 and retain the ball screw 79 against relative and longitudinal movement with respect to the piston rod 27.

Outwardly of motor mount plate 67 is ball screw pulley 85 secured on said ball screw by the key 87. D.C. motor 89 overlies cylinder tube 13 and in the illustrative embodiment bears against end cap 17 and is suitably secured to end portions of motor mount plate 67 as by the cap screws 91, FIG. 1.

Drive shaft 93 from said motor extends axially through motor mount plate 67 and mounts and has secured thereto pulley 95 which is connected to ball screw pulley 85 by the continuous belt 97.

Bushing pilot 99, of bronze, is supported within brake mount plate 69 and axially receives ball screw 79, which extends axially through the electric brake assembly 101. Said electric brake assembly is secured to brake mount plate 169 by a plurality of cap screws 102.

The fitting 103 receives the power lead 131, schematically shown in FIG. 1, as connected to the programmable control 123 and to the D.C. power source 125 through the lead 119.

In the illustrative embodiment within the electric brake assembly 101 there are provided a plurality of brake leaves 105 which are secured to the ball screw 79 for rotation therewith by a suitable key 107.

On application of an electrical input to the lead 131 to the electric brake assembly, the brake functions by applying a retaining torque upon leaves 105 for stopping rotation of the ball screw 79 at the time that the motor is de-activated by its programmable control 123.

Mounted upon the tie rods 33 outwardly of the brake mount plate 69 are a plurality of encoder risers or spacers 109. Apertured encoder mount plate 111 is positioned over the ends of said tie rods and secured thereto by the jamb nuts 35.

Electronic encoder 113 is mounted upon plate 111 and secured thereto as by the fasteners 114, FIG. 3, and includes an input drive shaft 115 axially of and spaced from the end of ball screw 79. Coupling 117 interconnects said ball screw and input drive shaft of said encoder for rotation in unison.

An electric circuit is schematically shown in FIG. 1 which includes lead 119 interconnecting the encoder 113 and the encoder feed back element or circuit 121 connected by the same lead to programmable control (PC) 123 and in turn connected by lead 119 to the power source 125 and by lead 127 to the motor control 129 of the D.C. motor 89. It is contemplated as equivalent to the present disclosure that instead of a programmable controller (PC) shown at 123, FIG. 1 there may be employed a computer numerical control (CNC) connected to the encoder feed back circuit 121 by the lead 119 and to the encoder 113.

Said encoder and under the control of the (PC) 123 or (CNC) functioning through the encoder feed back circuit 121 is adapted for controlling the direction and number of rotations of the ball screw 79, for effecting a programmed repetitive cycle of predetermined feed movements of the rod end 133. Said rod end projects from end cap 15 and is secured to the outer end of the piston rod 27 as by the threading 137.

Rod end 133, in the illustrative embodiment, is transversely apertured at 135 to provide a suitable connection for the load which is to be fed intermittently in one direction and reciprocated under the action of the piston rod 27 and the connected piston 43 and under the control of the ball screw 79.

As schematically shown, the electronic programmed control (PC) 123 is connected to the encoder 113 by the lead 119. The encoder feed back circuit is schematically shown by the box 121 which interconnects encoder 73 and the computer numerical control or (PC) 123. The output of the PC 123 is connected by lead 119 to the power source 125 and by lead 127 to the D.C. motor control 129, FIG. 1 for reversible motor 89.

Under the functioning and operation of the present electro servo drive pneumatic cylinder, its rod end is adapted for a programmed timed intermittent and reciprocal movements in a horizontal or other plane. In the illustrative embodiment said rod and has a stroke of 24 inches.

The present D.C. electric motor operated ball screw 79 has the encoder feed back 121 to a center P.C. (Programmable Control) or a P.N.C. (Programmable Numerical Control) as shown in FIG. 1. The unit is designed with the ball screw 79 operating and controlling the piston rod 27 of the air cylinder 13. In this manner pneumatic pressure can be used to support a variety of piston rod loads through the rod end 133 connected thereto. At the same time, the electric D.C. motor operated ball screw not only control the piston rod, but also its extremely accurate positioning at any increment of extension or retraction thereof with respect to the cylinder 13.

The present electric servo drive pneumatic cylinder provides a heavy duty accurate method of controlling motion in any direction and at the same time increases the load characteristics of the cylinder with the primary loads supported by the pneumatic controls and providing an accurate method for controlling motion of the piston in a single mechanism and requiring a minimum of space.

It is contemplated that for the proper operation of the present pneumatic cylinder, that the piston rod is retained against rotation. This is accomplished by the connection of the blind end 133 to the load as at 135.

In view of the trunion mounting 21 for the air cylinder assembly, and assuming some form of slide support for the load, it is contemplated that the present electro servo drive pneumatic cylinder can function and feed in any direction as desired.

The DC motor 89 may be replaced by an A.C. Synchronous Motor, as an equivalent. A translator is used to feed different impulses to said motor.

Having decribed my invention, reference should now be had to the following claims:

I claim:

1. An electronic servo-drive air cylinder comprising a cylinder tube having a blind end cap with a first pressure port and a rod end cap with a second pressure port;
   a tubular piston rod sealed within said cylinder and projecting through said rod end cap terminating in a rod end adapted for connection to a load to be reciprocated;
   a reciprocal piston in said tube secured to said piston rod;
   a ball nut axially mounted upon said piston rod adjacent said piston;
   a ball screw axially threaded through said nut and extended substantially the length of said piston rod and at one end slidably supported thereon, its other end extending through said piston and blind end cap and outwardly thereof;
   a D.C. motor mounted upon said blind end cap having a drive shaft;
   and drive means interconnecting said drive shaft and ball screw;
   said cylinder ports adapted for alternate connection to a source of pressurized air, whereby pneumatic pressure supports a variety of piston rod loads, and the motor operated ball screw controls the piston rod and accurately positions said rod at any increment of extension or retraction.

2. In the air cylinder of claim 1, said drive shaft being parallel to said ball screw;
   said drive means including pulleys interconnected by a belt and secured upon said drive shaft and ball screw respectively.

3. In the air cylinder of claim 1, the mounting of said motor including a motor mount plate at one end secured to and projecting from said blind end cap, said motor being secured to said motor mount plate and its drive shaft projecting therethrough.

4. In the air cylinder of claim 3, said motor overlying said cylinder tube on an axis parallel to said ball screw.

5. In the air cylinder of claim 1, a reversible valve connected to a source of pressurized air and having a pair of cylinder outlets connected to said ports respectively.

6. In the air cylinder of claim 1, said rod end adapted for timed intermittent longitudinal and reciprocal feed movements;
   and an electronic encoder aligned and coupled with said ball screw and connected to said motor for automatically controlling the direction and number of rotations of said ball screw for effecting a programmed repetitive cycle of predetermined longitudinal and reciprocal feed movements of said rod end.

7. The air cylinder of claim 6, a preset programmable control connected to said motor, and an electronic encoder feedback circuit interconnecting said encoder and said programmable control.

8. In the air cylinder of claim 6, a preset computer numerical control connected to said motor;
   and an encloder feedback circuit interconnecting said encoder and said computer numerical control.

9. In the air cylinder of claim 6, an encoder mount plate axially spaced from and secured to said blind end cap;
   said encoder being secured to said mount plate and having an input drive shaft axially spaced from said ball screw;
   and a coupling interconnecting said input drive shaft and said ball screw for rotation in unison.

10. In the air cylinder of claim 1, the mounting of said ball nut including an aperture end plate within said piston secured to and closing said piston rod, said ball nut being axially extended through said end plate.

11. In the air cylinder of claim 1, the mounting of said ball screw including bearings retained within said blind end cap journalling said ball screw intermediate its ends;
   and a bearing housing mounting bearings journalling said ball screw at one end and slidably mounted within and upon said piston rod.

12. In the air cylinder of claim 11, end trust means secured upon said ball screw retainingly engaging said bearings, limiting said screw to rotative movements relative to said piston rod.

13. In the air cylinder of claim 1, a pair of opposed outwardly projecting trunion mounts upon opposite sides of said blind end cap, said rod end being apertured for connection to said load and for preventing rotation of said piston rod.

14. In the air cylinder of claim 3, an apertured brake mount plate spaced from, parallel to and secured to said motor mount plate and receiving said ball screw;

and an electric brake assembly receiving said ball screw mounted upon and secured to said brake mount plate, said brake assembly including rotatably leaf members keyed to said ball screw;

and an electrical circuit including a power source connected to said motor and brake assembly for actuating said brake assembly on deenergization of said motor.

15. In the air cylinder of claim 3, an electronic encoder aligned and coupled with said ball screw and connected to said motor for automatically controlling the direction and number of rotation of said ball screw for effecting a programmed repetitive cycle of predetermined longitudinal and reciprocal feed movements of said rod end;

an encoder mount plate axially spaced from and secured to said blind end cap, said encoder being secured to said encoder mount plate and having an input drive shaft axially spaced from said ball screw;

a coupling interconnecting said input drive shaft and ball screw for rotation in unison;

an apertured brake mount plate spaced from and parallel to and secured to said motor mount plate and receiving said ball screw;

an electric brake assembly receiving said ball screw mounted upon and secured to said brake mount plate, said brake assembly including rotatable leaf members keyed to said screw, and an electrical circuit including a power source connected to said motor and brake assembly for actuating said brake assembly on deactivation of said motor;

the mounting and securing of said end caps, motor, brake and encoder mount plates including a plurality of parallel spaced tie rods extending through said caps and mount plates and secured thereto;

and spacers upon said tie rods between said brake mount plate and motor mount plate and said encoder mount plate.

* * * * *